United States Patent [19]
Matsumoto et al.

[11] Patent Number: 5,828,636
[45] Date of Patent: Oct. 27, 1998

[54] OPTICAL DISK APPARATUS HAVING OPTIMIZED FOCUS SHIFT MECHANISM CONTROL

[75] Inventors: Kiyoshi Matsumoto, Chiba; Hiroyuki Tsuchinaga, Odawara; Tsuyoshi Toda, Kodaira, all of Japan

[73] Assignee: Hitachi, Ltd., Tokyo, Japan

[21] Appl. No.: 711,147

[22] Filed: Sep. 10, 1996

[30] Foreign Application Priority Data

Sep. 11, 1995 [JP] Japan .................................... 7-232868

[51] Int. Cl.⁶ ....................................................... G11B 7/00
[52] U.S. Cl. .................................. 369/44.27; 369/44.29; 369/44.35
[58] Field of Search ............................ 369/44.27, 44.29, 369/44.31, 44.35, 54, 44.26, 44.36, 44.34

[56] References Cited

U.S. PATENT DOCUMENTS

| | | | |
|---|---|---|---|
| 5,140,576 | 8/1992 | Yamada et al. | 369/44.29 |
| 5,164,932 | 11/1992 | Fennema et al. | 369/44.27 |
| 5,251,194 | 10/1993 | Yoshimoto et al. | 369/44.26 |
| 5,574,706 | 11/1996 | Verboom et al. | 369/54 |
| 5,663,942 | 9/1997 | Ishibashi et al. | 369/44.36 |

*Primary Examiner*—Thang V. Tran
*Attorney, Agent, or Firm*—Fay, Sharpe, Beall, Fagan, Minnich & McKee

[57] ABSTRACT

An optical disk recording/reproducing apparatus includes at least a focus shift mechanism for controlling a lens to focus a laser beam on a disk so as to form a beam spot on the disk, a reproduced signal evaluator for evaluating the quality of the reproduced signal on the basis of the output from a reproduced signal detector, a controller for setting the operation target point of the focus shift mechanism, where the best quality of the reproduced signal is attained, on the basis of the output from the reproduced signal evaluator, and an offset generator circuit for outputting a focus offset signal in response to a command from the controller. The operation target point of the focus shift mechanism is set to the optimal point where the jitter in the reproduced signal is rendered minimum.

7 Claims, 7 Drawing Sheets

5,828,636

OPTICAL DISK APPARATUS HAVING OPTIMIZED FOCUS SHIFT MECHANISM CONTROL

BACKGROUND OF THE INVENTION

1. Field of the Invention

The present invention relates to an optical disk recording/reproducing apparatus for recording and/or reproducing a signal by converging a laser beam on a disk, and more particularly to an optical disk apparatus adapted to realize superior quality in a signal recording/reproducing operation.

2. Description of the Related Art

In an optical disk apparatus, information is recorded on and/or reproduced from a disk by converging a laser beam thereon. The spot of the converged laser beam is circular in its optimal state, and the size thereof is expressed substantially as $\lambda/NA$ (where $\lambda$ denotes the wavelength of the laser beam, and NA denotes the numerical aperture of a lens for converging the laser beam). In an example where a laser beam having a wavelength of 680 nm is converged by a lens having a numerical aperture of 0.55, the size of the spot formed as a result is approximately 1.2 $\mu$m. When information is recorded or reproduced by the use of such a spot, a disk and a recording/reproducing method are selected to obtain a track pitch of approximately 1.2 $\mu$m and a minimum mark length of 0.6 $\mu$m or so.

Preferably, the beam spot is circular. However, due to astigmatism in the laser diode source, aberrations of component elements of the optical system, or retardation of the disk base, there may occur some astigmatism in the laser beam converged on the disk. Upon the occurrence of such astigmatism, the beam spot on the disk may be rendered larger or the shape thereof may become elliptical. These disadvantages cause deterioration of the signal resolution or an increase in crosstalk from adjacent tracks to consequently deteriorate the signal quality.

It is possible to compensate for the astigmatism of the laser beam and the optical component aberrations at the time of apparatus adjustment. However, since such adjustments must be made individually for each apparatus, a great deal of labor is required. Regarding the retardation of a disk base, which is an optical distortion introduced in an optical disk base by a nonuniform cooling cure or nonuniform radiation cure during fabrication of the base, it has been impossible heretofore, because of dimensional variations of individual disk bases, to eliminate such retardation in the adjustment of the apparatus.

SUMMARY OF THE INVENTION

In view of the points mentioned above, the deterioration of the signal quality derived from astigmatism must be considered in the apparatus design, hence necessitating some sacrifice of the recording density in the prior art. It is therefore an object of the present invention to provide an improved optical disk apparatus which is capable of performing satisfactory signal recording and reproduction with superior quality despite the occurrence of astigmatism, thereby enhancing the recording density.

For the purpose of achieving the above object, the apparatus changes a target point of a focus shift mechanism employed to converge the laser beam on the disk, evaluates the quality of the reproduced signal, and automatically sets an operation target point where the best quality of the reproduced signal is attainable.

The shape of the beam spot formed on the disk can be changed by changing the target point of the focus shift mechanism. With various changes of the target point, the quality of the reproduced signal at each of the changed target points is evaluated. Then the target point of the focus shift mechanism is set to a point where the best quality signal is attained, and a recording/reproducing operation is performed in this state, whereby satisfactory recording and/or reproduction of the signal with the optimal spot shape is possible despite the existence of any astigmatism effects on the beam spot.

DETAILED DESCRIPTION OF THE PREFERRED EMBODIMENTS

Figure 1:
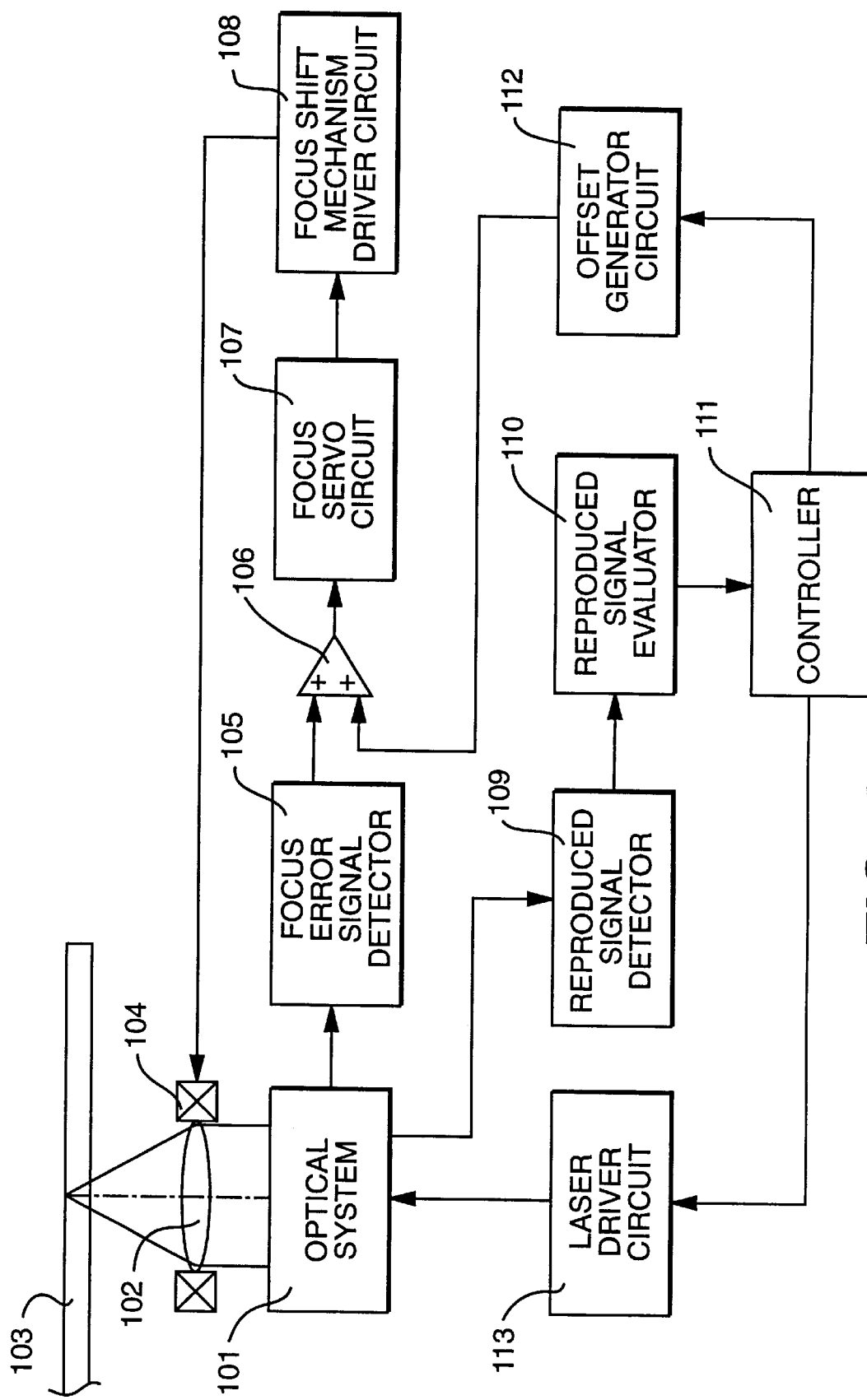
FIG. 1 is a block diagram showing a preferred form of an embodiment of the present invention.

FIG. 1 is a block diagram showing a preferred embodiment of the present invention. A laser beam emitted from an optical system 101 is converged on a recording film of a disk 103 by means of a converging lens 102. This lens 102 is movable by a focus shift mechanism 104 and is controlled to focus on the recording film to form a laser beam spot thereon. The focus shift mechanism 104 employs a voice coil, for example, and moves the converging lens 102 by causing a flow of current in the coil to thereby adjust the distance between the converging lens 102 and the disk 103.

The laser beam reflected from the disk 103 is returned to the optical system 101, where the laser beam is detected by a detector in the optical system 101 as will be described later. A focus error detector 105 receives a signal from the detector in the optical system 101 and generates a focus error signal which represents the focus error quantity of the laser beam converged on the disk 103. The output of the focus error signal detector is supplied via an adder 106 to a focus servo circuit 107.

The focus servo circuit 107 performs amplification, phase compensation, and so forth to execute focus servo control. The output of the focus servo circuit 107 is introduced to a focus shift mechanism driver circuit 108. This driver circuit 108 includes a current amplifier when a voice coil is employed in the focus shift mechanism 104, for example, and serves to drive the voice coil. When the output of an offset generator circuit 112 is zero, a beam spot focused on the disk 103 is formed through focus servo control. A reproduced signal detector 109 receives a signal from the detector in the optical system 101 and generates a reproduced signal.

A reproduced signal evaluator 110 evaluates the quality of the reproduced signal from the reproduced signal detector 109 and then supplies the result of such evaluation to a controller 111. Subsequently the controller 111 automatically sets, in accordance with a program and a memory incorporated therein, an operation target point where the best quality of the reproduced signal can be attained. The offset generator circuit 112 generates an offset in response to a command from the controller 111. This offset is added to the focus error signal in the adder 106. In response to a command from the controller 111, a laser driver circuit 113 drives a laser diode in the optical system 101 to emit a light beam therefrom.

Figure 2:
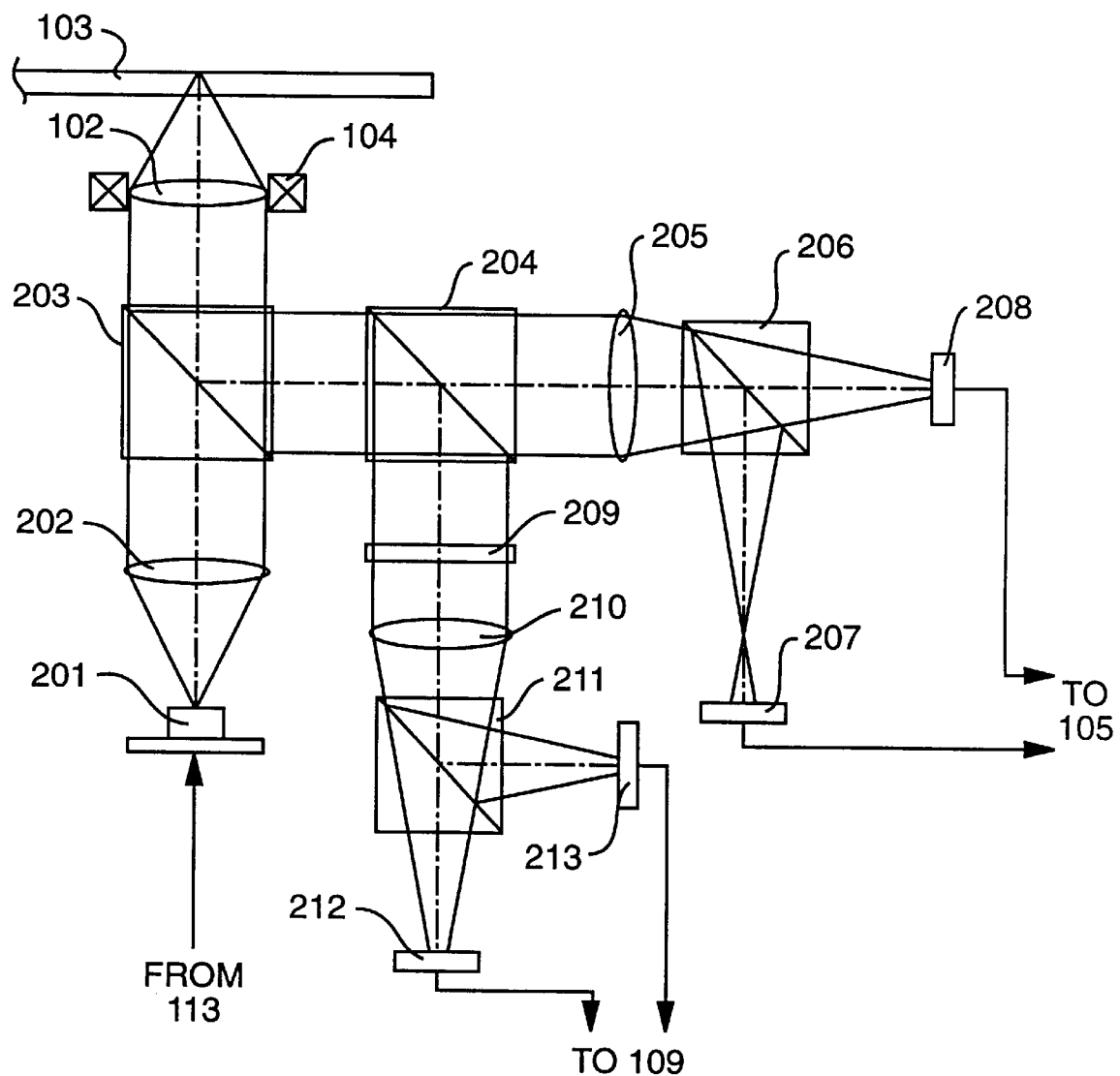
FIG. 2 shows details of an optical system employed in an embodiment of the present invention.

FIG. 2 shows details of the optical system 101, the converging lens 102, the disk 103, and the focus shift mechanism 104 shown in FIG. 1. The laser diode 201 is driven by a signal obtained from the laser driver circuit 113 in FIG. 1. The light rays emitted from the laser diode 201 are rendered parallel through a collimate lens 202. It is supposed that the light beam from the laser diode 201 is p-polarized in the direction along the drawing paper face.

The light beam transmitted via the collimate lens 202 is passed through a beam splitter 203. Then the light beam from the beam splitter 203 is converged on the tracks of the disk 103 by the converging lens 102. The converging lens 102 is controlled by the focus shift mechanism 104 to focus the laser light on the disk 103. Due to the Kerr effect of the medium, the light beam reflected from the disk 103 is caused to have a polarized component in the direction perpendicular to the drawing paper face. This is termed s-polarization, and its sign changes depending on whether information is recorded or not on the medium.

The light rays reflected from the disk 103 are made parallel through the converging lens 102 again and then introduced to the beam splitter 203. The light beam reflected from the beam splitter 203 is introduced to another beam splitter 204. Subsequently, the light beam passing through the beam splitter 204 is converged by a lens 205 and, after being split by a beam splitter 206, the beam is irradiated to detectors 207 and 208. The outputs of the detectors 207 and 208 are introduced to the focus error signal detector 105 shown in FIG. 1, whereby a focus error signal is generated.

The light beam reflected from the beam splitter 204 is introduced to a ½ wavelength plate 209. It is supposed here that the light beam incident upon the ½ wavelength plate 209 has a p-polarized light component Ep and an s-polarized light component Es. The phase is rotated by 45 degrees in the ½ wavelength plate 209, so that the p-polarized component of the outgoing light beam is turned to $Ep'=(Ep+Es)/\sqrt{2}$, and the s-polarized component thereof to $Es'=(Ep-Es)/\sqrt{2}$, respectively. The light beam from the ½ wavelength plate 209 is converged by a lens 210 and then is introduced to a polarized beam splitter 211. The light beam component Ep' travels straight through the polarized beam splitter 211 and is detected by a detector 212. Meanwhile the light beam component Es' is reflected from the polarized beam splitter 211 and is detected by another detector 213.

The outputs of the detectors 212 and 213 are introduced to the reproduced signal detector 109 shown in FIG. 1, whereby a reproduced signal is generated. In principle, the laser diode 201 has astigmatism, and the laser beam converged on the disk also has some astigmatism which is derived from the precision of optical elements inclusive of lenses and beam splitters, and further from the retardation of the base of the disk 103. The aspect of the existence of such astigmatism is shown in FIG. 3.

Figure 3:
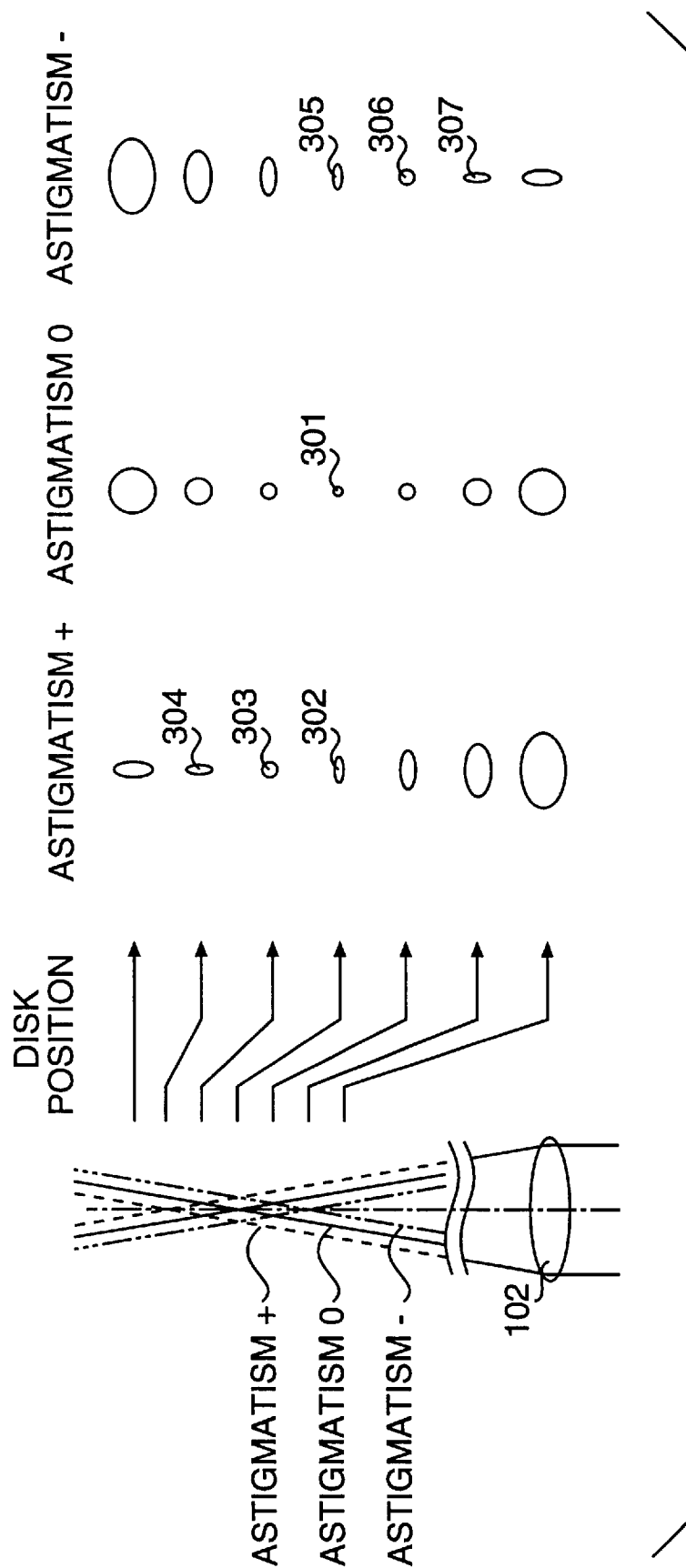
FIG. 3 illustrates a light beam and cross-sections thereof.

FIG. 3 is an enlarged view illustrating the light beam in the vicinity of the focus of the converging lens 102, and some cross-sections of the light beam. A solid line indicates a light beam in the absence of astigmatism, while a dotted line and a single-dot chained line indicate a light beam in the presence of positive (+) and negative (−) astigmatism, respectively. It is supposed here that a shift of the focus derived from astigmatism does not affect the light component in the direction perpendicular to the drawing paper face, but does affect the light component in the direction along the drawing paper face. It is also supposed here that a shift of the focus derived from astigmatism is positive (+) in the direction to recede from the converging lens 102.

In the absence of astigmatism, the beam diameter is minimum at the focal point of the converging lens 102, and its cross-section is circular as denoted by reference numeral 301. Further, the cross-section of the light beam is rendered larger at any other position away from or closer to the lens. In the absence of astigmatism, the best result is achieved when the recording plane of the disk is so positioned that the cross-section 301 is obtained. In the presence of positive (+) astigmatism, the cross-section of the light beam becomes elliptical as denoted by reference numeral 302 at the focal point of the converging lens. A circular cross-section 303 of the light beam is attained at a position further away from the converging lens. This cross-section of the light beam is termed a minimum aberrant circle.

However, the cross-sectional axis of the beam in this case is rendered larger than the diameter of the minimum cross-section 301 obtained in the absence of astigmatism. Further, at a position more distant therefrom, the cross-section of the light beam becomes elliptical as denoted by reference numeral 304 with a 90-degree deviation of its major axis from the cross-section 302 of the light beam at the focal point. Meanwhile, in the presence of negative (−) astigmatism, the cross-section of the light beam becomes elliptical as denoted by reference numeral 305 at the focal point of the converging lens. A circular cross-section 306 of the beam is obtained at a position closer to the converging lens. This cross-section of the beam is termed a minimum aberrant circle as well.

In this case also, however, the cross-sectional axis is rendered larger than the diameter of the minimum cross-section 301 obtained in the absence of astigmatism. And at a position yet closer to the lens, the cross-section of the beam becomes elliptical as denoted by reference numeral 307 with a 90-degree deviation of its major axis from the cross-section 305 of the beam at the focal point. Thus, when there exists any astigmatism, it is impossible to unconditionally determine the position to perform signal recording and/or reproduction from the positions of the beam sections 302–304 or 305–307.

FIGS. 4(a)–4(c) illustrate how a beam spot having some astigmatism scans a track on a signal-recorded disk. A groove 401 is formed in the disk, and the portion between mutually adjacent grooves is a track. It is supposed here that data 402 are written on each track.

FIG. 4(a) illustrates how a track is scanned by a beam spot 403 that is a minimum aberrant circle in cross-section and corresponds to beam sections 303 or 306 shown in FIG. 3.

FIG. 4(b) illustrates how a track is scanned by a beam spot 404 that is longer orthogonally to the track and corresponds to beam sections 304 or 307 shown in FIG. 3. Since the beam spot axis in the scanning direction is shorter than the diameter of the beam spot 403, the resolution attained in the signal reproduction is enhanced. However, due to the longer axis orthogonal to the track, the signal leakage from the adjacent track, i.e., crosstalk, is decreased.

FIG. 4(c) illustrates how a track is scanned by a beam spot 405 that is shorter orthogonally to the track and corresponds to beam sections 302 or 305 shown in FIG. 3. Since the beam spot axis is shorter orthogonally to the track, the signal leakage from the adjacent track, i.e., crosstalk, is decreased.

However, due to the longer spot axis in the scanning direction, the resolution in the signal reproduction is deteriorated. If the track density is low while the signal recording density is relatively high, the example of FIG. 4(*b*) is advantageous, but if the track density is high while the signal recording density is relatively low, the example of FIG. 4(*c*) is advantageous. When both of the track density and the signal recording density are adequately high, the example of FIG. 4(*a*) is advantageous.

Figure 4:
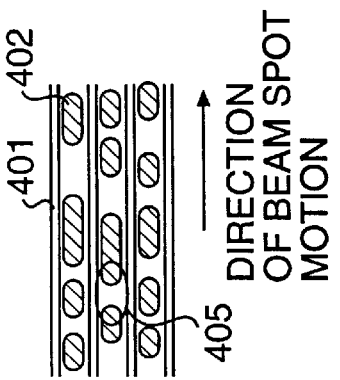
FIGS. 4(a) to 4(c) illustrate beam spots having some astigmatism.
Figure 4:
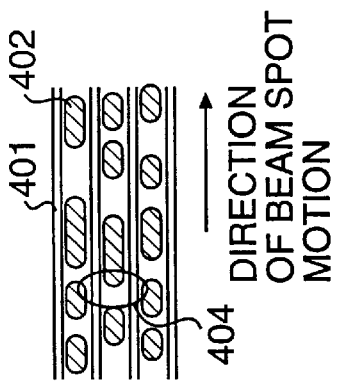
Figure 4:
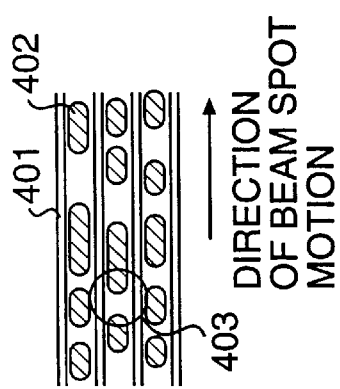

The quality of the reproduced signal can be evaluated by checking the jitter in the signal. Therefore, it is possible to determine, out of the states in FIGS. 4(*a*) to 4(*c*) or in intermediate states therebetween, a proper state to perform reproduction of the signal by selecting the point where the jitter of the reproduced signal is minimum. Changing the shape of the light beam spot to beam spot 403, 404, or 405 as shown in FIGS. 4(*a*), 4(*b*), or 4(*c*) can be realized by enabling the focus servo circuit to change the target point of the focus shift mechanism. More specifically, the shape of the beam spot can be changed by adding an offset to the focus error signal. The constitution for realizing such a process is shown in FIG. 1.

Figure 5:
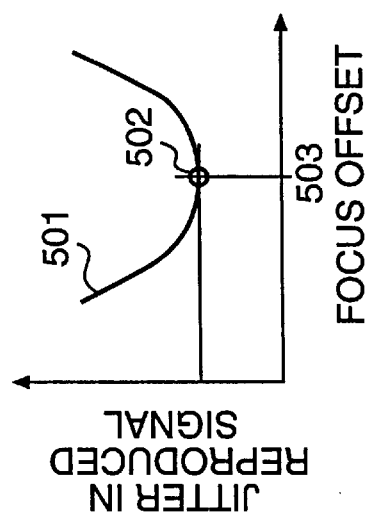
FIG. 5 graphically shows a jitter curve.

FIG. 5 graphically shows the jitter in the reproduced signal with changes of the focus offset. As shown, a jitter curve 501 has a minimum point 502. It follows, therefore, that the best-quality reproduced signal is obtainable by reproducing the signal with addition of the focus offset 503 thereto.

Figure 6:
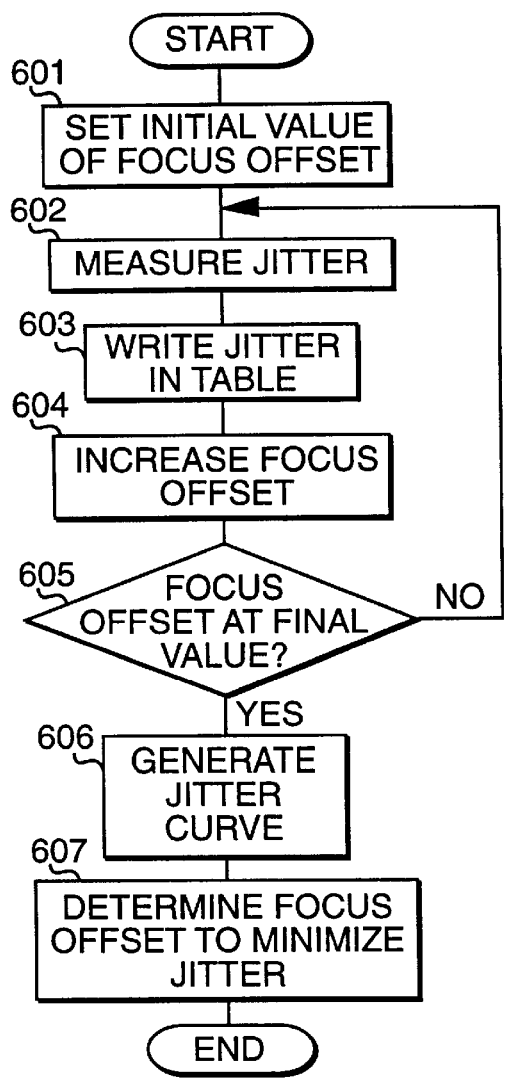
FIG. 6 shows a routine for measuring a jitter curve.

FIG. 6 shows a routine for measuring the jitter curve 501 in FIG. 5. This routine is controlled by the controller 111 in FIG. 1. First, an initial value of the focus offset is set (601). Then the signal is reproduced, and the jitter is measured (602). Subsequently, the value of the focus offset and the value of the measured jitter are written in a table (603). This table is stored in a memory incorporated in the controller, for example.

Thereafter the value of the focus offset is increased (604). A decision is made as to whether the focus offset has reached its final value (605), and if the result of the decision signifies that the offset has not yet reached the final value, the processing returns to the step of measuring the jitter (602). If the result of the above decision signifies that the offset has reached the final value, a jitter curve is generated on the basis of the offset value and the table of the measured data (606). Since the value of the added focus offset is discrete, there may arise a case where an optimal offset is an intermediate of discrete values.

Accordingly, a jitter curve may be generated through fitting, for example by a method of least squares with quadratic functional approximation, in accordance with a program and a memory incorporated in the controller 111. Further, an offset for minimizing the jitter is determined automatically from the jitter curve thus generated (607), whereby the routine is completed.

Figure 7:
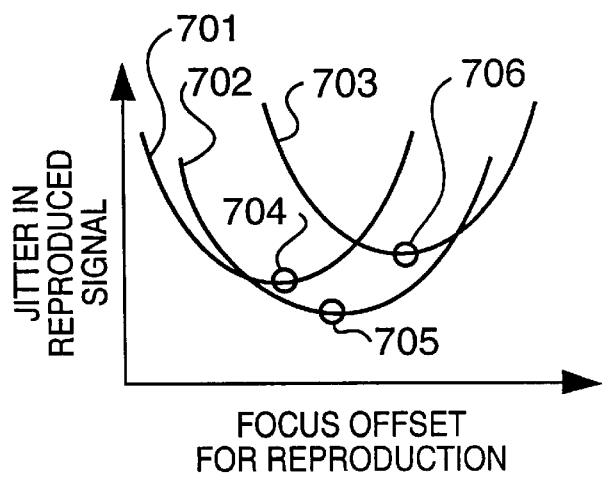
FIG. 7 graphically shows jitter curves.

In the example mentioned, the focus offset in the reproduction mode alone is changed. However, there is another case where the focus offset in the recording mode also is to be changed for better evaluation. FIG. 7 graphically shows some jitter curves generated by changing the focus offsets in both of the recording and reproduction modes.

The jitter curves 701, 702, and 703 are examples plotted by first changing the focus offset in three steps in the recording mode and then changing the focus offset in the reproduction mode correspondingly to each of the three steps. The jitter curves 701, 702, and 703 have minimum points 704, 705, and 706, respectively. In this exemplary case, satisfactory recording and reproduction can be performed at the minimum point 705 of the jitter curve 702 to obtain the best-quality signal.

Figure 8:
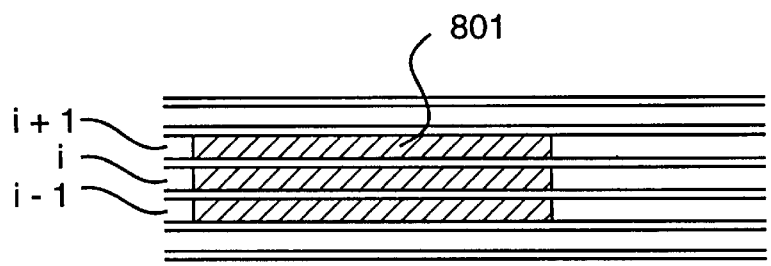
FIG. 8 illustrates a test area.

FIG. 8 illustrates an example where a test area is provided on a disk for evaluation of the recording and so forth. A test area 801 is formed over three tracks i−1, i, and i+1. For evaluation inclusive of crosstalk, data need to be written also on both neighboring tracks adjacent to a desired track to be evaluated, whereby it is rendered necessary for the test area to cover three or more tracks.

In a CAV (Continuous Angular Velocity) recording system, the linear velocity differs depending on the radius of the disk, and recording/reproducing conditions such as clock pulses are also different. For this reason, it is preferred that at least three test areas be formed along inner, intermediate, and outer circumferences of the disk. In the case of a disk where tracks are divided into a plurality of zones and recording/reproducing conditions are changed per zone, it is preferred that at least one test area be provided in each zone.

Now an exemplary test pattern for practical evaluation will be described below. First, a repetition of the longest recording pattern used in the apparatus is written on the tracks i−1 and i+1. This is based on the reason that the crosstalk affecting the adjacent tracks increases in amount as the pattern becomes longer. Subsequently, a repetition of the densest pattern used in the apparatus is written on the track i while the focus offset is changed in steps because, in the densest pattern, the signal level is the lowest and the condition is severe. The densest pattern is reproduced with changes of the focus offset, and the jitter is evaluated.

As described above, with regard to the test area for setting an operation target point, it is necessary to form one or more test areas on a disk so as to determine the target point of the focus shift mechanism in each of the recording and reproduction modes. Further, test areas are provided at three positions along the inner, intermediate, and outer circumferences of the disk. When tracks on the disk are divided into a plurality of zones where respective clocks for recording or reproduction are mutually different, at least one test area is formed in each zone.

Figure 9:
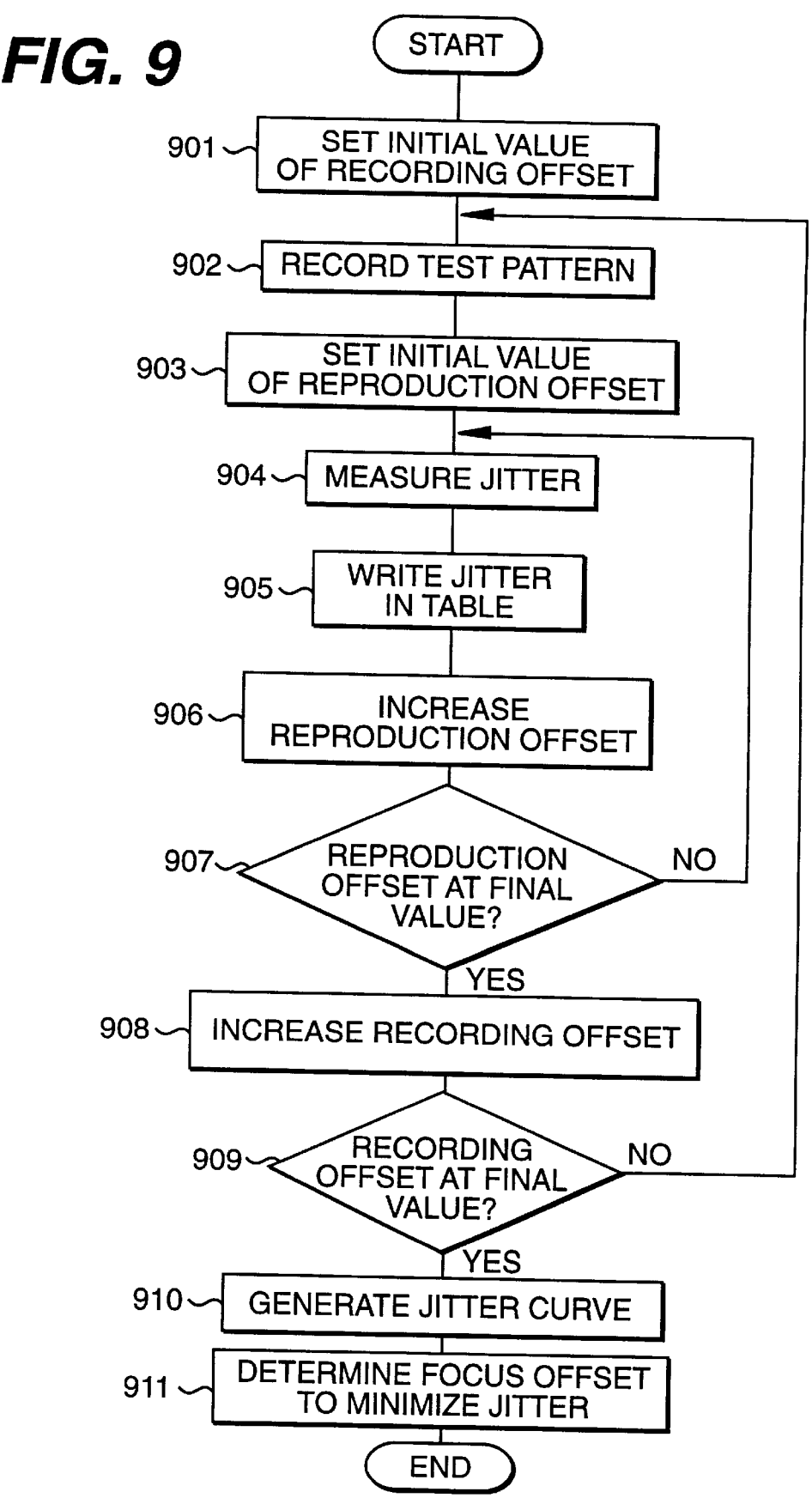
FIG. 9 shows another routine for measuring a jitter curve.

FIG. 9 shows a routine for measuring the jitter curves in FIG. 7. It is supposed here that the longest recording pattern used in the apparatus is written previously on the tracks i−1 and i+1, and also that recording and reproduction of the test pattern is performed on the track i. This routine is controlled by the controller 111 in FIG. 1.

First, an initial value of the focus offset in the recording mode is set (901), and the test pattern is recorded (902). Then, an initial value of the focus offset for reproduction is set (903) and, after the signal is reproduced, the jitter therein is measured (904). Subsequently, the values of the focus offsets in both recording and reproduction modes and the value of the measured jitter are written in a table (905). This table is stored in a memory incorporated in the controller, for example.

Thereafter, the value of the focus offset for reproduction is increased (906). Then, a decision is made as to whether the focus offset for reproduction has reached its final value or not (907), and if the result of such a decision signifies that the offset has not reached the final value yet, the processing returns to the step of measuring the jitter (904). If the result of the above decision signifies that the offset has reached the final value, the measurement relative to one recording-mode focus offset is completed, and the value of the recording-mode focus offset is increased (908).

Thereafter, a decision is made as to whether the recording-mode focus offset has reached the final value or not (909), and if the result of such a decision signifies that the offset has not reached the final value yet, the processing returns to the step of recording the test pattern (902). If the result of the above decision signifies that the offset has reached the final value, a jitter curve is generated on the basis of the offset value and the table of the measured data (910). Subsequently, focus offsets for minimizing the jitter in both recording and reproduction modes are determined automatically from the jitter curve thus generated (911), whereby the routine is completed. As described, the operation target point is selectively switchable in the signal recording and reproduction modes.

Figure 10:
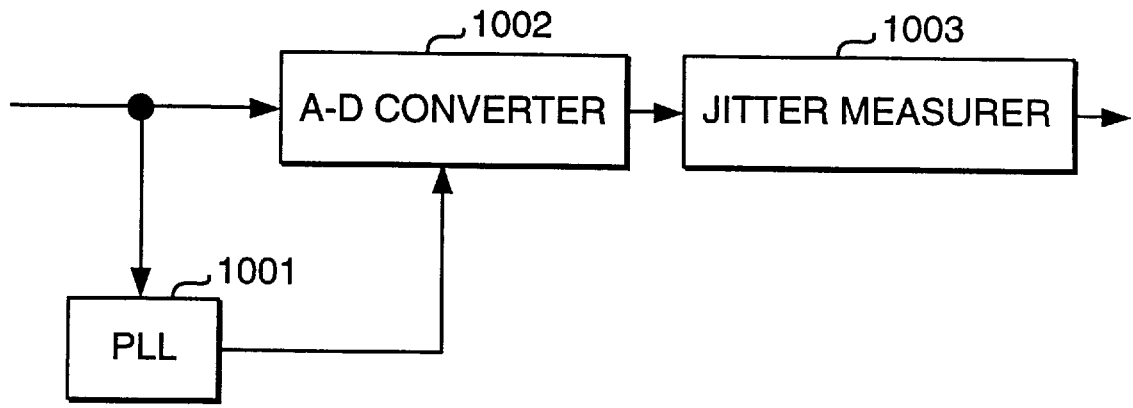
FIG. 10 shows an example of a reproduced signal evaluator.

FIG. 10 shows a structural example of the reproduced signal evaluator shown in FIG. 1. A phase-locked loop (PLL) 1001 generates clock pulses in synchronism with the reproduced signal. An analog-to-digital (A–D) converter 1002 samples the reproduced signal in accordance with the clock pulses from the PLL 1001, and supplies the digitized data to a jitter measurer 1003. This jitter measurer is realized by means of software on a DSP (Digital Signal Processor), for example.

Figure 11:
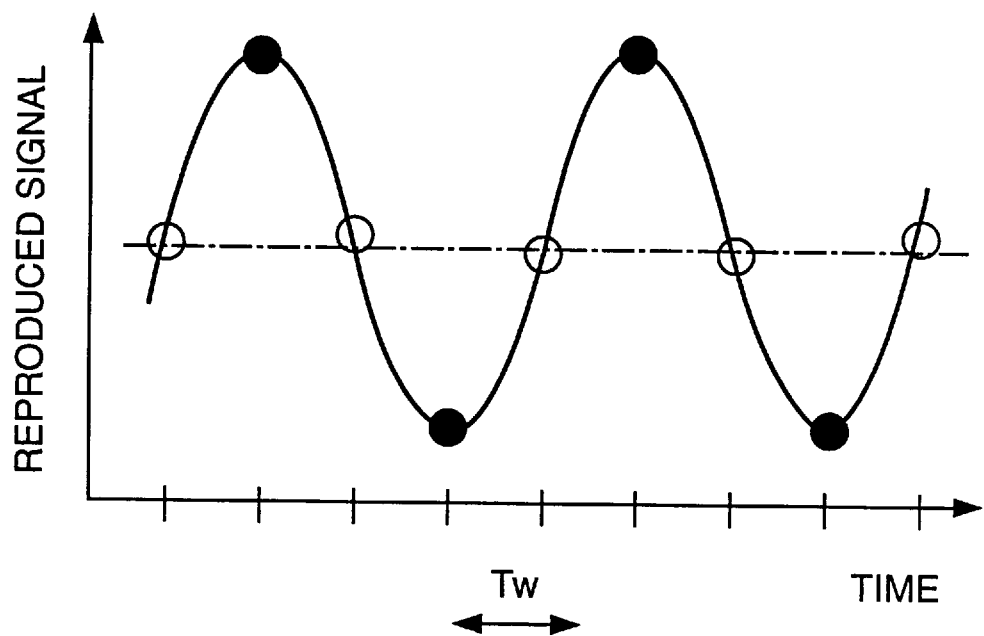
FIG. 11 graphically shows an exemplary test pattern.

FIG. 11 graphically shows an example of using a test pattern which has a period of 4Tw, where Tw is a window width, in a mark length recording operation to detect the edge of a record mark. The jitter can be evaluated by sampling the white-circle portions shown in the figure in a period of 2Tw, and checking variations of the reproduced signal level at the sampling points.

In the description given above, the quality of the reproduced signal is evaluated on the basis of the jitter included therein. However, it is also possible to execute the evaluation by examining, in addition to the jitter, the maximum point of the signal amplitude.

According to the present invention, even when some astigmatism exists on a disk, signal recording and reproduction can be performed with a beam spot of an optimal shape to consequently achieve substantial enhancement of the recording density, hence realizing a greater capacity of the optical disk apparatus.

Various modifications of the features and embodiments described above will become apparent to the person of ordinary skill in the art to which the invention pertains. All such modifications that basically rely upon the teachings through which the invention has advanced the state of the art are properly considered within the spirit and scope of the invention.

We claim:

1. An optical disk recording/reproducing apparatus, comprising:

means for generating and outputting a laser beam for recording/reproducing a signal with respect to a disk;

a focus shift mechanism for converging the laser beam onto the disk; and means for automatically setting a target point of said focus shift mechanism to read/write a signal from/to the disk;

wherein the means for automatically setting a target point:

sets a plurality of target points of the focus shift mechanism in a preliminary recording mode from one of the target points to write a signal on the disk;

sets a plurality of target points of the focus shift mechanism in a preliminary reproducing mode to read a signal that was written according to one of said target points set in said preliminary recording mode;

determines one pair of the target points, said pair being constituted by one of the target points set in said preliminary recording mode and one of the target points set in said preliminary reproducing mode; and sets each of the target points constituting said pair of target points as the target points of said focus shift mechanism in a recording mode and a reproduction mode, respectively.

2. An optical disk recording/reproducing apparatus according to claim 1, wherein the means for automatically setting a target point determines one pair of the target points constituted by one of the target points set in said preliminary recording mode and one of the target points set in said preliminary reproducing mode to get less jitter than the other pairs of the target points.

3. An optical disk recording/reproducing apparatus according to claim 1, wherein said one pair of the target points is determined as a pair that gives a minimum point on a jitter curve that is generated through fitting by a method of least squares with quadratic functional approximation, using jitter values obtained on the target points in said preliminary reproducing mode.

4. An optical disk recording/reproducing apparatus according to claim 1, wherein said one pair of the target points is determined with signals written in a test area that is formed over at least three adjacent tracks on the disk.

5. An optical disk recording/reproducing apparatus according to claim 4, wherein said one pair of the target points is determined as a pair that gives a minimum point on a jitter curve that is generated through fitting by a method of least squares with quadratic functional approximation using jitter values obtained on the target points in said preliminary reproducing mode.

6. An optical disk recording/reproducing apparatus, comprising:

a focus shift mechanism for controlling a lens to focus a laser beam onto a disk so as to form a beam spot thereon;

a focus error signal detector for generating a focus error signal that represents the focus error quantity of the reproducing laser beam focused on the disk;

a reproduced signal detector for detecting, via an optical system, a reproduced signal generated by the reproducing laser beam, and for providing an output of the detection;

a focus servo circuit for executing a focus servo control by supplying an output thereof to said focus shift mechanism;

a reproduced signal evaluator for evaluating the quality of the reproduced signal based on the output from said reproduced signal detector, and for providing an output of the evaluation;

a controller for setting an optimal operation target point of said focus shift mechanism where a desired quality of the reproduced signal is attained, based on the output from said reproduced signal evaluator;

an offset generator circuit for outputting a focus offset signal in response to a command from said controller; and an adder for adding the focus error signal from said focus error signal detector and the focus offset signal from said offset generator circuit, and outputting a signal representing the result of the addition to said focus servo circuit;

wherein said focus shift mechanism has an operation target point that is determined with signals written in a test area that is formed over at least three adjacent tracks on the disk.

7. An optical disk recording/reproducing apparatus, comprising:

means for generating and outputting a laser beam for recording/reproducing a signal from a disk;

means including a focus shift mechanism for converging the laser beam onto the disk; and means for automatically setting an operation target point of said focus shift mechanism to attain a desired quality of signal reproduced from the disk, by:

setting a plurality of preliminary reproducing beam operation target points of the focus shift mechanism with respect to a test area on the disk, to thereby generate a corresponding plurality of reproduced signals, the test area being formed over at least three adjacent tracks on the disk;

calculating an optimal one of the plurality of preliminary reproducing beam operation target points that attains the desired quality reproduced signal of all of the preliminary reproducing beam operation target points, by interpolation based on qualities of the reproduced signals obtained at respective ones of the plurality of preliminary reproducing beam operation target points; and setting the optimal reproducing beam operation target point as the operation target point of said focus shift mechanism.

* * * * *